3,403,108
ALUMINOSILICATE CATALYST CONTAINING A GROUP VIII METAL COMPOUND AND A METAL HALIDE
Harry P. Leftin, Livingston, and Oleg K. Kononenko, Boonton, N.J., assignors to Pullman Incorporated, Chicago, Ill., a corporation of Delaware
No Drawing. Filed June 24, 1964, Ser. No. 377,469
9 Claims. (Cl. 252—429)

This invention relates to a particular contact material and to the preparation and use thereof. In one aspect the invention relates to a contact material particularly useful in processes by which a substituent is introduced into an ethylenically unsaturated compound with retention of the ethylenic point of unsaturation. In another aspect the invention relates to an improved method for producing unsaturated esters of carboxylic acids, unsaturated ethers and unsaturated halides.

Among the more important raw materials employed in industry today are vinyl compounds which are used extensively for the production of polymers, resins, plasticizers, intermediates for the synthesis of pharmaceuticals, adhesives and other valuable products. Thus, for example, vinyl acetate is used chiefly in the preparation of polymers, copolymers, and resins including those derived from its polymer (polyvinyl acetate) such as polyvinyl alcohols and polyvinyl acetals. Vinyl acetate also finds general application as an acetylating agent. Vinyl chloride is another raw material used in the manufacture of valuable resins including polyvinyl chloride resins, and copolymers of vinyl chloride with vinyl acetate or other unsaturated esters. By the addition of acids and alcohols to acetylene, the corresponding vinyl esters and vinyl ethers can be produced. Thus today, vinyl acetate is produced commercially by passing gaseous acetic acid and acetylene through charcoal impregnated with cadmium or zinc salts at an elevated temperature. In accordance with this type of process, which also is applicable to the production of other vinyl esters, the triple bond of the acetylene is converted to an ethylenic point of unsaturation due to the addition of the acid or other compound containing reactive hydrogen across the triple bond. Although the yields of vinyl derivatives produced from acetylene are satisfactory, there are several drawbacks to such processes. Due to the fact that purification of acetylene is relatively difficult and involves special techniques which add to the cost of the raw material as compared, for example, with ethylene, the cost of the final product is necessarily enhanced. In addition, special techniques and precautions are required in handling acetylene due to its explosive nature. Therefore, a process by which vinyl derivatives may be produced from a source other than acetylene is highly desirable.

Other methods for producing vinyl derivatives involve the use of saturated compounds and the conversion thereof to ethylenically unsaturated products by methods such as dehydrohalogenation. Such processes, however, are not selective and lead either to low yields of desired product or loss of starting material due to side reactions which are relatively difficult to control or avoid.

It is an object of this invention to provide a particular contact material and a method for the preparation thereof which contact material is especially useful for the production of substituted ethylenically unsaturated compounds.

Another object is to provide an improved process for introducing a substituent into an olefinic compound with retention of the olefinic point of unsaturation.

Another object is to provide an improved process for the production of unsaturated esters of carboxylic acids such as vinyl acetate by reaction of an olefinic compound such as ethylene with a carboxylic acid such as acetic acid.

A further object is to provide an improved process for the production of unsaturated ethers by reaction of an olefinic compound and a hydroxy-containing organic compound such as alcohols and phenols.

A further object is to provide an improved contact material for effecting the conversion of an olefinic compound to a substituted derivative thereof with retention of the olefinic unsaturation which contact material allows for the production of the desired substituted unsaturated derivative in a reaction medium which is less than substantially anhydrous with minimization of by-product formation.

Various other objects and advantages of this invention will become apparent to those skilled in the art from the accompanying description and disclosure.

Accordingly, the above objects are accomplished by the method which comprises contacting an olefinic compound with a contact material consisting essentially of an alkaline metal aluminosilicate, between about 0.1 and about 15 weight percent of a compound of a platinum group metal and between about 0 and about 30 weight percent of a halide of a dissimilar metal having a variable valence and present in its highest oxidation state. In accordance with one embodiment of this invention, the olefinic compound is contacted in the presence of said catalyst with a member of the group consisting of a carboxylic acid and a hydroxy-containing organic compound to produce an unsaturated ester and ether, respectively. In accordance with a second embodiment of the process of this invention, the olefinic compound is contacted as essentially the sole organic reactant with the said catalyst containing between about 1 and about 30 weight percent of the halide of the aforesaid dissimilar metal to produce a halogenated derivative of the olefin as a product of the process.

As noted above, one essential ingredient of the contact materials of this invention is an alkaline metal aluminosilicate, or zeolite, in which the alkaline metal is an alkali metal, an alkaline earth metal or a combination thereof and in which the various atoms, i.e., the said alkaline metal, aluminum, silicon and oxygen, are arranged in a substantially uniform crystalline pattern the pores of which have a substantially uniform diameter. Such crystalline zeolites fall within the class of metal aluminosilicates known in the art as molecular sieves. The empirical formula of suitable molecular sieves for use in the process of this invention is as follows:

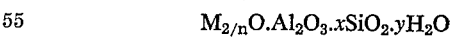

$$M_{2/n}O.Al_2O_3.xSiO_2.yH_2O$$

in which M is an alkali metal (i.e., lithium, sodium, potassium, rubidium and cesium), an alkaline earth metal (i.e., calcium strontium, barium and magnesium) or a combination thereof; $n$ is a number from 1 to 2; $x$ is a number having an average value from about 1.8 to about 7.4; and $y$ is a number having an average value from 0 up to about 9. Various series of synthetic zeolitic molecular sieves are known to the art such as those of the A, D, L, R, S, T, X, and Y series, the average of $x$ and $y$ varying as between these series of synthetic zeolites. For example, in the molecular sieves of the X series the value of $x$ in the above empirical formula is about $2.5 \pm 0.5$, the average value of $y$ in the fully hydrated form varying depending upon the composition of the metal, M. For example, in the fully hydrated sodium form of the zeolites of the X series, the average value of $y$ is about 6.2, and in the magnesium or lithium forms, the average value of $y$ is about 8. In the zeolites of the A series, the value of $x$ in the above empirical formula is $1.85 \pm 0.5$, the average value of $y$ of the sodium form being about 5.1. Generally the zeolites of the T series have the highest number of silica molecules, the average value of $x$ for the sodium form being about $6.9 \pm 0.5$.

In the preparation of the sodium forms of the molecular sieves of any of the above series the silica is derived from silica gel, silicic acid or sodium silicate, and the alumina may be derived from any of the various forms of activated alumina, alpha-alumina, alumina trihydrate or sodium aluminate. The source of sodium is usually sodium hydroxide. One particular method of preparation comprises admixing aqueous solutions of sodium aluminate and sodium hydroxide followed by the addition of the admixture to aqueous solution of sodium silicate. The mixture is stirred, usually at room temperature, and the zeolite is allowed to crystallize usually at a temperature of about 100° C. The resultant crystalline zeolite is separated from the mother liquor and the crystals are washed with water until the filtrate has a pH between 9 and 12. The crystals are then dried and are ready for use. The zeolites of the various series referred to above are prepared in substantially the same manner with variation, however, in the composition of the initial mixture of reactants. For example in the preparation of the sodium form of the zeolites of the X series, the reacting mixtures, expressed as the oxides, have a composition within the following ranges: 3–5 of $SiO_2/Al_2O_3$; 1.2–1.5 of $Na_2O/SiO_2$; and 35–60 of $H_2O/Na_2O$. In the preparation of the sodium form of the A series the initial reaction mixture contains the reactants in the following proportions, expressed as the oxides: 0.5–2.5 of $SiO_2/Al_2O_2$; 0.8–3.0 of $Na_2O/SiO_2$; and 35–200 of $H_2O/Na_2O$.

The other alkali metal and alkaline earth metal forms are conveniently prepared by ion exchange with the sodium forms such as by passing a solution of a soluble salt of the metal to be exchanged with the sodium, through a bed of the sodium form and thereafter washing with water and drying. The degree of exchange can be regulated by controlling the concentration of the solution of the metal to be exchanged with the sodium cation, such that exchange of any percent of the sodium cations up to 100 percent is effected. Molecular sieves prepared by the above typical procedures are suitable for use in producing the contact materials of this invention.

In accordance with the teachings of this invention the contact materials are prepared by the method which comprises treating the zeolite with a compound of a platinum group metal dissolved or dispersed in a liquid medium followed by drying of the mass to remove the solvent or dispersant such that the platinum group metal compound is distributed on the external surface of the zeolite. The term "platinum group metal" as used herein is defined as a metal of Group VIII of the Periodic Table having an atomic number of at least 44 and includes palladium, platinum, ruthenium, rhodium, osmium and iridium and mixtures thereof. Suitable compounds of the platinum group metal which can be used are the inorganic salts such as the halides including fluorides, chlorides, bromides and iodides, sulfates, nitrates, cyanides, phosphates and perchlorates as well as complex salts such as those consisting of an alkali metal, halogen and the platinum group metal; and organic salts such as the acetates, formates, propionates, and oxalates; and organic and inorganic coordination complex compounds such as amino, nitro, nitroso, olefin and nitrile containing coordination salts. Compounds of the platinum group metal in which the metal is present in any of its valence states are suitable. Typical examples of such compounds are: palladium dichloride, palladium dibromide, palladium di-iodide, palladium dicyanide, palladium dinitrate, potassium chloropalladate, tetramminepalladium chloride, platinum dichloride, platinum dibromide, platinum dicyanide, platinum tetrachloride, platinum tetrabromide, potassium chloroplatinate, nitrosylchloroplatinic chloride, rhodium trichloride, rhodium trisulfate, ruthenium trichloride, ruthenium tetrachloride, ruthenium disulfate, potassium ruthenocyanide, osmium dichloride, osmium trichloride, osmium tetrachloride, potassium chloroosmite, iridium tetrabromide, iridium tetrachloride, iridium tribromide, iridium hexafluoride, iridium triiodide and iridium sulfate.

The platinum group metal compound is preferably applied to the zeolite in the form of a solution which can be aqueous or non-aqueous, although it also is within the scope of this invention to apply the compound in the form of a fine dispersion. Suitable solvents and dispersants include: water; polar organic solvents typically exemplified by ketones such as acetone, methylethylketone and cyclohexanone; alcohols such as methyl alcohol, ethyl alcohol, isopropyl alcohol and ethylene glycol; ethers such as diethyl ether, dimethoxyethane, dioxane and tetrahydrofuran; acidic solvents such as acetic acid, hydrochloric acid, hydrobromic acid and nitric acid; and complexing solvents such as acetonitrile, benzonitrile, ethylene diamine and olefins such as pentene and cyclohexene. The choice of solvent or dispersant depends largely on the solubility of the particular compound to be applied to the zeolite. In those instances where the compound is only slightly soluble, the desired amount of compound is deposited usually by an extraction technique such as by continuously passing the solvent over the platinum group metal compound such as in a Soxhlet or similar type of reflux apparatus. The amount of the platinum group metal compound deposited on the zeolite ranges between about 0.1 and about 15 weight percent, based on the total weight of the composition and is usually present in an amount between about 1 and about 5 weight percent. After the zeolite has been impregnated with the solution or dispersion of this component the mass is dried to remove the solvent or dispersing agent. The drying step is usually effected at a temperature between about 25° C. and about 250° C., although this may vary depending upon the particular solvent employed.

As noted above, the contact materials of this invention may also contain as a third ingredient a halide of a dissimilar metal, i.e., a metal other than the platinum group metal, having a variable valence and present in its highest valence state such as ferric halides, cupric halides, chromic halides, mercuric halides and tungsten halides. Typical examples of this component are ferric chloride, cupric chloride, cupric bromide, tungstic chloride, mercuric chloride and chromic chloride. The particular amount of this metal halide which is introduced into the composition depends to a large extent on the subsequent use of the catalyst as discussed in greater detail below. When the contact material does contain the metal halide such as cupric halide, it is present in an amount between about 1 and about 30 weight percent, based on the total weight of the contact material, and such that the mole ratio of the platinum group metal to the dissimilar metal halide is between about .001:1 and about 1:1.

The cupric halide type component can be introduced into the catalyst prior to application of the platinum group metal compound to the zeolite or subsequent thereto or simultaneously therewith and is usually applied in the form of a solution or dispersion in any one of the aforesaid solvents. After the solution of this component is applied, the contact mass is again dried, usually within the aforesaid drying temperatures to remove solvent such that this metal halide component is also distributed on the external surface of the zeolite.

As stated above, the catalysts of this invention are advantageously employed to effect substitution reactions of olefinic compounds such as those involving reaction of an olefinic compound with (1) a carboxylic acid to produce ester derivatives, (2) a hydroxy-containing organic compound to produce ethers and (3) a metal halide halogenating agent such as cupric halide. The term "olefinic compound" as used herein is intended to include within its scope compounds containing at least one aliphatic carbon-to-carbon double bond which can be acyclic or alicyclic, at least one carbon atom of the double bond being substituted with hydrogen or halogen. The olefinic compound may have from 2 to 12 carbon atoms and usually has from 2 to 8 carbon atoms. The preferred class of olefinic compounds are those having the general formula:

$$R—CH=CZR'$$

in which the R and R' radicals are selected from the group consisting of hydrogen and an organic radical having from 2 to 8 carbon atoms including alkyl, alkylene, aryl, aralkyl, and halogen-substituted derivatives thereof, and Z is a member of the group consisting of hydrogen and halogen. It is to be understood that the R and R' radicals may be the same or different and that the olefinic compound may contain one or more additional aliphatic carbon-to-carbon double bonds, at least one carbon atom of which is substituted with hydrogen or halogen. Typical examples of suitable acyclic olefinic compounds used in accordance with the teachings of this invention are: hydrocarbon olefins of the homologous series, $C_nH_{2n}$, in which $n$ is an integer from 2 to 12 such as ethylene, propylene, butene, pentene, hexene . . . dodecene including branched isomers thereof such as isobutene, isopentene and iso-octene; diolefins such as butadiene-1,3, 2,3-dimethyl butadiene-1,3 and pentadiene-1,4; aryl substituted olefins such as styrene, alphamethyl styrene, para-ethyl styrene, 2,4-dimethyl styrene and divinyl benzene; and halogen substituted olefins such as vinyl chloride, vinyl bromide, 1-bromopropene, 1-bromo-hexene-1, 2-chloropropene, 1-chloro-2-methyl propene, 2-chloro-3-phenyl-propene, allyl chloride, 2-chlorobutadiene, 2,4-dichlorostyrene, 2-chlorobutadiene-1,3, and 1-chloro-3-butene. Typical examples of suitable cyclo-aliphatic olefinic compounds are cyclopentene, cyclohexene and cyclopentadiene. Other suitable olefinic compounds include acrylonitrile and acrylic acid.

In accordance with the teachings of this invention the olefinic compound is reacted in the presence of the contact materials of this invention with an organic reactant of the group consisting of carboxylic acids and hydroxy-containing reactants represented, respectively, by the general formulas $R_1—COOH$ and $R_2—OH$ in which $R_1$ and $R_2$ groups are alkyl, alkylene or aryl radicals including various combinations thereof such as aralkyl and aralkylene radicals having from 1 to 10 carbon atoms per radical and, in addition, $R_1$ may be hydrogen. Suitable classes of such reactants are: the aliphatic saturated and unsaturated carboxylic acids including those of the homologous series, $C_nH_{2n+1}COOH$ and $C_nH_{2n-1}COOH$, and dicarboxylic acids; the aliphatic saturated and unsaturated primary, secondary and tertiary alcohols; aromatically unsaturated compounds including benzoic and naphthoic acids and phenols and naphthols as well as compounds containing a combination of aromatic and aliphatic groups such as acids and alcohols having a cinnamyl or benzyl group as a substituent. Typical examples of suitable carboxylic acids for use in accordance with this invention are formic acid, acetic acid, propionic acid, butyric acid, isobutyric acid, oleic acid, hexanoic acid, n-valeric acid, octanoic acid, lauric acid, acrylic acid, vinyl acetic acid, benzoic acid, meta-toluic acid, naphthoic acid, cinnamic acid, malonic acid, phenyl acetic acid, and p-methoxybenzoic acid. Typical examples of suitable hydroxy-containing reactants are those of the homologous series methanol, ethanol, propanol, butanol, pentanol . . . lauryl alcohol; corresponding secondary and tertiary alcohols such as propanol-2, tertiary-butyl alcohol, tertiary-amyl alcohol, octanol-2; cyclohexanol; decahydronaphthol; allyl alcohol; phenol; benzyl alcohol; styrol; cinnamyl alcohol; beta-phenyl-ethyl alcohol; naphthol; and ethylene and propylene glycols. Also included within the scope of this invention is the use of reactants containing both the carboxylic acid and hydroxy radicals such as glycolic and lactic acids.

In producing esters and ethers by the process of this invention, the olefinic compound is contacted with the carboxylic acid or hydroxy-containing organic compound in the vapor phase in the presence of the zeolitic molecular sieve supported platinum group metal compound to produce corresponding unsaturated esters and ethers, respectively. When the Z radical of the olefinic compound, $R—CH=CZ—R'$, is hydrogen, the reactions proceed as follows wherein palladium chloride is used to typically represent the platinum group metal compound:

$$R—CH=CH—R'+R_1COOH+PdCl_2 \rightarrow$$
$$R—CH=CR'—OCOR_1+2HCl+Pd \quad (1)$$

$$R—CH=CH—R'+R_2—OH+PdCl_2 \rightarrow$$
$$R—CH=CR'—OR_2+2HCl+Pd \quad (2)$$

When the Z radical of the olefinic compound, $$R—CH=CZ—R'$$

is halogen (X) the reactions proceed as illustrated by the following equations wherein palladium chloride is used to typically represent the platinum group metal compound:

$$R—CH=CX—R'+R_1COOH+PdCl_2 \rightarrow$$
$$R—CH=CR'—OCOR_1+HX+PdCl \quad (3)$$

$$R—CH=CX—R'+R_2—OH+PdCl_2 \rightarrow$$
$$R—CH=CR'—OR_2+HX+PdCl \quad (4)$$

The reactions of Equations 1 and 2, and of 3 and 4, above are separate and distinct reactions in that when the Z radical is hydrogen, the platinum group metal compound is converted to elemental metal whereas when the Z radical is halogen the reaction proceeds without net formation of elemental metal. As seen from Equations 1 through 4, the presence of the cupric halide type component, is not essential in obtaining the desired ester and ether product. However, from the standpoint of the life and regeneration of the contact mass, the cupric halide type component is advantageously employed as a third component as discussed in greater detail below.

The above substitution reactions, typically represented by Equations 1 through 4, are effected in accordance with the teachings of this invention in the vapor phase at a temperature between about 100° F. and 600° F., and more usually at a temperature between about 150° F. and about 450° F. When the olefinic compound is normally gaseous such as in the case of ethylene, propylene, butylene and vinyl chloride and a lower carboxylic acid or alcohol, i.e., having from 1 to 6 carbon atoms, is used, the temperature is preferably maintained between about 275° F. and about 425° F. The reactions are usually effected at a pressure from about 0 (atmospheric pressure) to about 300 pounds per square inch gage (p.s.i.g.), although higher pressures can be used without departing from the scope of this invention. The mol ratio of olefinic compound and carboxylic acid or hydroxy-containing reactant as charged to the reaction zone may similarly vary over a relatively wide range and is usually between about 0.5:1 and about 10:1.

The contact materials of this invention are also advantageously employed to convert an olefinic compound having the general formula $R—CH=CH—R'$ in which R and R' are as defined above, to halogen substituted derivatives having the formula $R—CH=CX—R'$ in which X is halogen, by reaction of the olefinic reactant with the contact materials containing the platinum group metal compound in combination with the halide of a dissimilar metal which can exist in more than one oxidation state and present in its highest valence state such as ferric and cupric halides. When the contact material of this invention is so utilized as a halogenating agent, the cupric chloride type component is present in an amount between about 10 and about 30 weight percent based on the total weight of the catalyst. This reaction is also conducted in the vapor phase at a temperature between about 200° and about 600° F. more usually between about 300° and about 525° F., and at atmospheric pressure or at a pressure above or below atmospheric pressure. In general the pressure ranges between about 0 and about 300 p.s.i.g.

As noted above, the cupric halide type component is not essential in bringing about the reactions of Equations 1 through 4 above. However, as illustrated by Equations 1 and 2 above, elemental platinum group metal is formed when the olefin is a hydrocarbon, and, in providing an economically feasible process, the platinum group metal is oxidized to a higher valence state by regeneration in situ or in a zone separate from the reaction zone to which the olefinic compound is fed. One method of accomplishing regeneration comprises reacting the elemental platinum group metal with the compound of a dissimilar metal having a variable valence and present in its highest oxidation state such as those enumerated above, according to the following equation in which palladium and cupric chloride are used as typical and illustrative reactants:

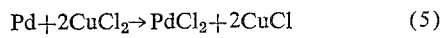

$$Pd + 2CuCl_2 \rightarrow PdCl_2 + 2CuCl \quad (5)$$

When the cupric halide is added to the contact mass of this invention, the regeneration of the palladium is carried out within the aforesaid operating conditions simultaneously with the conversion of the olefinic compound to the desired ester or ether derivative. When so functioning as a regenerating agent, the cupric halide type component is present in an amount between about 1 and about 20 weight percent based on the total weight of the composition and such that the atom ratio of platinum group metal to copper (or other polyvalent metal) is between about 0.001:1 and about 1:1.

Another method of regenerating the platinum group metal component comprises reacting the elemental metal with oxygen of an oxygen-containing gas, and hydrogen halide according to the following illustrative equation:

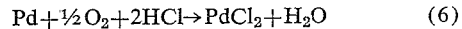

$$Pd + \tfrac{1}{2}O_2 + 2HCl \rightarrow PdCl_2 + H_2O \quad (6)$$

The term "oxygen-containing gas" as used herein includes air, substantially pure molecular oxygen, as well as oxygen diluted with an inert gas such as nitrogen or helium and containing at least 5 mol percent oxygen. The reaction of Equation 6 can be effected with or without passage of the organic reactants through the reaction zone. For example, when it becomes necessary to reoxidize the platinum group metal, the introduction of olefinic compound and carboxylic acid or hydroxy-containing organic reactant through the reaction zone is cut off and the oxygen-containing gas passed therethrough such that the gases are brought into contact with the contact mass at a temperature between about 100° F. and about 600° F. and usually at a temperature between about 150° F. and about 450° F. Alternatively, the oxygen-containing gas can be charged to the reaction zone such that the regeneration proceeds simultaneously with the reaction of the olefin and acid or hydroxy-containing reactant. In the same manner, oxygen and hydrogen halide are used to maintain the cupric halide type component in its highest oxidation state without interrupting the process, according to the following illustrative equation:

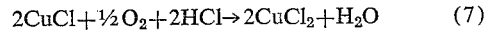

$$2CuCl + \tfrac{1}{2}O_2 + 2HCl \rightarrow 2CuCl_2 + H_2O \quad (7)$$

As illustrated by Equations 1 through 4 above, hydrogen halide is produced as a by-product of the substitution reactions leading to the formation of ester and ether derivatives, and is also produced during the formation of halo-olefins such as vinyl chloride by reaction of ethylene with the cupric halide containing contact mass. In liquid phase systems, the hydrogen halide by-product can exert an inhibitory action on the desired reactions and thus it is usually preferred to effect the reactions in the presence of an added hydrogen halide acceptor such as disodium hydrogen phosphate which renders the hydrogen halide innocuous. By the use of the present contact materials, however, it is observed that the hydrogen halide does not exert an inhibitory effect notwithstanding the fact that a hydrogen halide acceptor is not added to the contact mass. The reason for this lack of inhibitory effect of hydrogen halide in using the contact materials of this invention is not fully understood, since it has been further observed that substantial amounts of hydrogen halide are retained by the contact material during the course of the above reactions. The retention of the hydrogen halide is of advantage from the standpoint of regeneration of the catalyst. Thus the quantity of hydrogen halide fed to the reaction zone is considerably reduced and in fact it need not be fed continuously to the reaction zone with the oxygen-containing gas since sufficient halide value is retained by the contact mass and is available for the regeneration of the platinum group metal compound with oxygen. However, it is to be understood that hydrogen halide can be fed to the reaction zone with the oxygen-containing gas without departing from the scope of this invention, a convenient source thereof being the hydrogen halide which is separated from the reaction zone effluent. In general, the mol ratio of molecular oxygen to hydrogen halide (either derived from an external source or from the contact mass) required for the regeneration, ranges from 0.5:1 to 100:1.

The regeneration techniques of Equations 5–7 above, involve conversion or maintenance of the platinum group metal compound in the form of a halide and usually in the form of chloride. Although the platinum group metal compound may initially be deposited on the molecular sieve in the form of an acetate, nitrate, etc., it is converted to halide during the aforesaid regeneration reactions. Thus, the term "platinum group metal halide" as used herein in defining the contact materials of this invention is intended to include compositions to which the platinum group metal halide is added as such during the initial catalyst preparation, as well as compositions in which the halide is formed during the course of the reaction and regeneration.

It has been found that by the use of the contact materials of this invention, substantial amounts of water can be tolerated in the reaction zone without substantially decreasing the selectivity of the process. It is known that a hydrocarbon olefin reacts with water in the presence of a platinum group metal compound such as palladium chloride, to produce carbonyl compounds such as aldehydes and ketones and that this is a very rapid reaction. It has been found, quite unexpectedly that if water is present in the reaction zone when using the contact materials of this invention, the above substitution reactions of the olefinic compound to produce esters, ethers or halogenated derivatives, proceed as the predominant reactions with minimum formation of ketones and aldehydes due to the reaction of water with the olefinic compound. Thus in addition to effecting the above substitution reactions under substantially anhydrous conditions these reactions can be effected in the presence of substantial amounts of water, i.e., between about 0.1 and about 20 mol percent of water based on the moles of olefinic compound introduced to the reaction zone. This advantage is of particular significance in providing a continuous process for the production of the desired derivatives with continuous regeneration of the contact material. For example, as shown by Equations 1 and 2 above, the platinum group metal compound is converted to elemental metal and, in order to provide a commercially feasible process it is desirable to regenerate the metal compound since the elemental form of the metal does not promote the desired reaction. One method of converting the elemental metal to the corresponding metal halide is to react the elemental metal with oxygen and hydrogen chloride according to Equation 6 above. As can be seen from that equation, water is formed as a by-product of the regeneration reaction. However, since the reaction between the olefinic compound and water to produce carbonyl compounds is suppressed by the use of the contact materials of this invention, it is unnecessary to treat the regenerated catalyst to remove substantially all of the water formed during the regeneration prior to reuse. Because the above reactions can tolerate the presence of substantial amounts of water in the reaction zone, the above substitution reactions can be effected with simultaneous regeneration of the catalyst by passing an oxygen-containing gas through the reaction zone together with the olefinic compound and carboxylic acid or hydroxyl-containing organic compound. Alternatively, the contact materials can be regenerated in a separate reactor by reaction with oxygen and hydrogen chloride at a temperature between about 100° F. and about 600° F. and at a pressure between about 0 and about 300 p.s.i.g.

The following examples are offered as a better and further understanding of the present invention and are not to be construed as unnecessarily limiting thereto.

EXAMPLE I

Palladium dichloride (2.0 grams) was placed in the thimble of a Soxhlet extraction apparatus and a sodium zeolite molecular sieve (100 grams) was placed in the lower portion of this apparatus. The sodium zeolite employed was Linde Company X–13 molecular sieve having a pore diameter of about 9.8 Angstrom units and allowing molecules having nominal radii of about 13 Angstrom units to pass into the pores thereof due to molecular and lattice vibrations. Acetone was refluxed over the palladium chloride until the palladium chloride was completely washed onto the molecular sieve. When all of the palladium chloride was transferred to the molecular sieve the acetone was removed by evaporation and the composite oven dried for 24 hours at 120° C. The finished catalyst contains 2 percent by weight of palladium dichloride distributed on the external surface of the molecular sieve.

EXAMPLE II

A vertical, atmospheric pressure, flow reactor heated by means of a Nichrome winding was packed with 35 grams (60 cc.) of the molecular sieve supported palladium chloride contact mass prepared in accordance with Example I above. The upper portion of the reactor tube, packed with interlocking saddles (40 cc.), served as a preheat zone. The tube was heated to 190° C. and a gaseous mixture of hydrogen chloride gas and oxygen (2:1 molar ratio) was passed through the catalyst for about 4 hours during which time some water was collected. This treatment was followed by the passage of a stream of nitrogen through the catalyst bed at 190° C. The catalyst bed was then brought to a temperature of 90–95° C. and was maintained at this temperature while a stream of vinyl chloride saturated (at 90–93° C.) with acetic acid vapor was passed therethrough at a vinyl chloride flow rate of approximately 50 cc. per minute. Gases exiting from the reactor were passed through a water cooled trap followed by two Dry Ice acetone cooled traps. The liquid product collected after two hours operation under the aforesaid conditions was analyzed by mass spectrometer and found to contain the following components on a mol percent basis: 0.815 mol percent of vinyl acetate; 0.1 mol percent of acetaldehyde; trace amounts of ethylidene diacetate and acetal; 7.15 mol percent of unreacted vinyl chloride; and 91.8 mol percent of unreacted acetic acid. The selectivity of the reaction in producing vinyl acetate was 89 percent at about a 1 percent conversion.

EXAMPLE III

At the end of Example II above the temperature of the catalyst bed was brought to 190–200° C. and a stream of vinyl chloride saturated (at 90–93° C.) with acetic acid was passed therethrough at a vinyl chloride flow rate of approximately 50 cc. per minute. The hydrogen chloride which was produced during the course of the run was monitored and the amount collected after 20–24 hours was found to be equivalent to a 137% conversion of the reactants on the basis of palladium chloride thereby indicating the catalytic nature of this reaction. The liquid product collected after a 7 hour run under the aforesaid conditions was analyzed and found to contain 1.5 mol percent of vinyl acetate; 0.3 mol percent of acetaldehyde; 0.1 mol percent of ethylidene diacetate; 62 mol percent of unreacted acetic acid and 36.1 mol percent of unreacted vinyl chloride. The selectivity of the reaction in producing vinyl acetate was 79 percent at a 2.9 percent conversion of acetic acid.

EXAMPLE IV

A deactivated contact mass which initially contained palladium chloride supported on the molecular sieve prepared in accordance with Example I above, was regenerated by passing a stream of oxygen through the catalyst at 190° C. until no further water was produced. After flushing the regenerated bed with nitrogen, a stream of vinyl chloride saturated (at 90° C.) with acetic acid was fed to the reactor. The catalyst bed was maintained at a temperature of 90° C. for 6 hours. Upon analysis, the liquid product which was collected was found to have the following composition, expressed on a mol percent basis: 87 mol percent of acetic acid; 11.5 mol percent of vinyl chloride; 0.5 mol percent vinyl acetate; 0.1 mol percent acetaldehyde; 1.0 percent water and a trace amount of ethylidene diacetate. These results represent a 1 percent conversion of acetic acid at which conversion the selectivity of the reaction in producing vinyl acetate was 80 percent on the basis of vinyl chloride reacted. Notwithstanding the fact that a considerable amount of residual water produced during the regeneration of the catalyst still remained in the catalyst bed, only one-tenth of it was converted to acetaldehyde.

When the procedure of this example was repeated at a reaction temperature of 200° C. instead of at 90° C., a similar product distribution was obtained at a higher conversion, i.e., at a 4 percent conversion based on acetic acid.

EXAMPLE V

Palladium chloride (2 grams) was suspended in 300 ml. of acetone followed by passage therethrough of dry hydrogen chloride gas until a clear solution was obtained. Sodium zeolite molecular sieve (100 grams) (Linde Company X–13 molecular sieve) was then added to the solution and after stirring for one hour the acetone solvent was removed in a flash evaporator. The supported palladium chloride on molecular sieve was then oven dried at 120° C.

EXAMPLE VI

The above described reactor, packed with the contact material prepared in accordance with Example V above, was flushed with nitrogen and the catalyst bed was heated at 200° C. while passing a 2:1 molar mixture of hydrogen chloride gas and oxygen therethrough for three hours followed by passage of a stream of nitrogen through the bed at the same temperature. Ethylene feed saturated with ethanol vapors at 75° C. was passed through the catalyst bed which was maintained at a reaction temperature of 200° C. for about one and half-hours. The liquid product collected under these conditions was analyzed and found to contain 0.4 mol percent of ethyl vinyl ether; 0.3 mol percent of diethyl acetal; 0.3 mol percent of diethyl ether; 0.1 mol percent of ethyl acetate, the remainder being substantially all unreacted ethanol.

EXAMPLE VII

At the end of Example VI above the reactor was flushed with nitrogen at 190° C. followed by the passage therethrough of vinyl chloride saturated (at 75° C.) with ethanol at a vinyl chloride flow rate of approximately 50 cc. per minute. The reaction temperature was maintained at 200° C. for one and one-half hours during which time vinyl ethyl ether was formed as a product of the process as determined by mass spectrometer analysis.

EXAMPLE VIII

At the end of Example VII above the contact material contained in the reactor was treated with a 2:1 molar mixture of hydrogen chloride gas and oxygen at 190° C. followed by the passage of nitrogen through the reactor at a temperature of 200° C. until no further water removal was evident. The reactor temperature was then adjusted to 200–210° C. Ethylene was passed through a saturator containing absolute ethyl alcohol thermostatted at 75° C. The ethylene-alcohol mixture was passed into the reactor at an ethylene flow rate of 45 cc. per minute. After one hour of operation 5.9 grams of liquid product was collected. Mass spectrometric analysis showed that the liquid product contained 0.82 mole percent of vinyl ethyl ether and 1.0 mole percent of diethyl acetal corresponding to 19.6 percent yield of vinylation products, based on $PdCl_2$. After a total of 9½ hour sof operation, a total yield of approximately 93 percent of vinylation products, based on palladium chloride, was attained.

EXAMPLE IX

The contact mass of palladium chloride supported on the sodium zeolite produced in accordance with Example I above was impregnated with an aqueous solution of cupric chloride in an amount sufficient to provide a mol ratio of palladium chloride to cupric chloride in the final composite of 1:1. The impregnated mass was then dried and charged to a vertical, atmospheric pressure, flow reactor heated by means of a Nichrome winding. A stream of nitrogen was passed through the bed of the contact material at 200° C. until the evolution of water was no longer evident. Ethylene was then passed through a saturator containing acetic acid maintained at 90–93° C. The ethylene saturated with acetic acid vapor was then passed through the reactor in contact with the catalyst mass which was maintained at a temperature of 190–200° C. Liquid product was collected and, upon analysis, was found to contain in addition to unreacted reactants, 0.4 mol percent vinyl acetate and 0.2 mol percent acetaldehyde. The conversion of ethylene and acetic acid to vinyl acetate was 0.41 percent and the selectivity of the reaction in producing vinyl acetate was 67 percent.

EXAMPLE X

The three component contact mass employed in Example IX above was reactivated using a stream of hydrogen chloride and oxygen in an $HCl:O_2$ molar ratio of 2:1, at 200° C. followed by passage therethrough of a stream of nitrogen at 200° C. Vinyl chloride was then passed through a saturator containing acetic acid at 90° C. and the vaporous admixture was fed to the reactor at 190° C. In addition to unreacted reactants, the liquid product collected contained 0.2 mol percent of vinyl acetate and 0.2 mol percent acetaldehyde.

EXAMPLE XI

The sodium form of molecular sieve available commercially as Linde Molecular Sieve X–13 is impregnated with palladium chloride and cupric chloride in accordance with the procedures of Examples I and IX, respectively, to produce a final composite containing 4 weight percent palladium chloride and 20 weight percent cupric chloride. 35 grams are charged to the above-described reactor, and feed containing ethylene is fed to the reactor maintained at a reaction temperature of 250° C. The effluent from the reaction zone comprises a substantial amount of vinyl chloride as a product of reaction.

When the above Examples II–IV and VI–X are repeated using other alkaline metal aluminosilicates such as the potassium and calcium forms, the reactions proceed similarly yielding the indicated unsautrated ester and ether derivatives. It is to be understood that other vinyl derivatives may be produced by the reaction of ethylene with other acids and alcohols in the vapor phase in accordance with the teachings of this invention such as, for example, vinyl acrylate, vinyl butyrate, vinyl laurate, divinyl adipate, vinyl phenyl acetate, vinyl p-toluate and 2-vinyl naphthoate. In addition to the vinyl derivatives, other unsaturated esters and ethers are produced by the process of this invention such as the isopropenyl, butenyl, etc., derivatives by using propylene, butene, etc., in place of ethylene or vinyl chloride and the appropriate carboxylic acid or alcohol.

From the above it is apparent that by the teachings of this invention, an improved contact material is provided for producing esters, ethers and halogenated derivatives of olefins. That there is a synergistic effect between the molecular sieve and palladium chloride is evidenced by the fact that palladium chloride supported on another, different high surface area support is not an efficacious contact material in producing the desired result. For example, when vinyl chloride and acetic acid were contacted in the vapor phase at 90–95° C. and again at 200° C. in the presence of a contact mass consisting of activated alumina having a surface area of about 140 square meters per gram and containing about 2 weight percent palladium chloride, vinyl acetate was not recovered from the reaction zone effluent. However non-chlorinated higher boiling organic products were detected having molecular weights of 138, 182, 196. Such higher boiling products are not observed in the reaction zone effluent when the molecular sieve supported contact materials of this invention are employed.

It is to be understood that various modifications and alterations of the contact materials and process of this invention may become apparent to those skilled in the art without departing from the scope of this invention.

Having described our invention, we claim:

1. A composition of matter consisting of an alkaline metal aluminosilicate, between about 0.1 and about 15 weight percent of a compound of a metal of Group VIII of the Periodic Table having an atomic number of at least 44 and between about 1 and about 30 weight percent of a halide of a dissimilar metal having a variable valence and present in its highest oxidation state, said halide of the dissimilar metal being selected from the group consisting of ferric, cupric, chromic and tungstic halides.

2. A composition of matter consisting of between about 0.1 and about 15 weight percent of palladium chloride and between about 1 and about 30 weight percent of cupric chloride deposited on an alkaline metal aluminosilicate.

3. The composition of claim 1 in which said alkaline metal is an alkaline earth metal.

4. The composition of claim 1 in which said alkaline metal is an alkali metal.

5. The composition of claim 1 in which said Group VIII metal is palladium.

6. The composition of claim 1 in which said halide of the dissimilar metal is cupric chloride.

7. The composition of claim 1 in which said halide of the dissimilar metal is ferric chloride.

8. A composition of matter consisting of an alkaline metal aluminosilicate zeolite, between about 0.1 and about 15 weight percent of a compound of a metal of Group VIII of the Periodic Table having an atomic number of at least 44 and between about 1 and about 30 weight percent of a metal chloride selected from the group consisting of cupric chloride and ferric chloride.

9. A composition of matter consisting of an alkaline metal aluminosilicate, between about 0.1 and about 15 weight percent of a compound of a metal of Group VIII of the Periodic Table having an atomic number of at least 44 and between about 1 and about 30 weight percent of a halide of a dissimilar metal selected from the group consisting of a ferric halide and a cupric halide.

References Cited

UNITED STATES PATENTS

| | | | |
|---|---|---|---|
| 2,547,928 | 4/1951 | Davis et al. | 252—441 X |
| 3,031,514 | 4/1962 | Kosmin | 252—441 X |
| 3,226,339 | 12/1965 | Frilette et al. | 252—455 |
| 3,318,802 | 5/1967 | Martin | 252—455 XR |

PATRICK P. GARVIN, *Primary Examiner.*

PO-1050
(5/69)

UNITED STATES PATENT OFFICE
CERTIFICATE OF CORRECTION

Patent No. 3,403,108      Dated September 24, 1968

Inventor(s) Harry P. Leftin and Oleg K. Kononenko

It is certified that error appears in the above-identified patent and that said Letters Patent are hereby corrected as shown below:

Column 3, line 39, for "$SiO_2/Al_2O_2$" read --$SiO_2/Al_2O_3$--. Column 5, line 51, after "which" and before "$R_1$" insert --the--. Column 12, line 9, for "unsautrated" read --unsaturated--.

SIGNED AND SEALED
OCT 13 1970

(SEAL)
Attest:

Edward M. Fletcher, Jr.
Attesting Officer

WILLIAM E. SCHUYLER, JR.
Commissioner of Patents